Aug. 23, 1955 A. J. EISLER ET AL 2,715,918
MODIFIED AXMINSTER LOOM AND METHOD
Filed Feb. 20, 1952 10 Sheets-Sheet 4
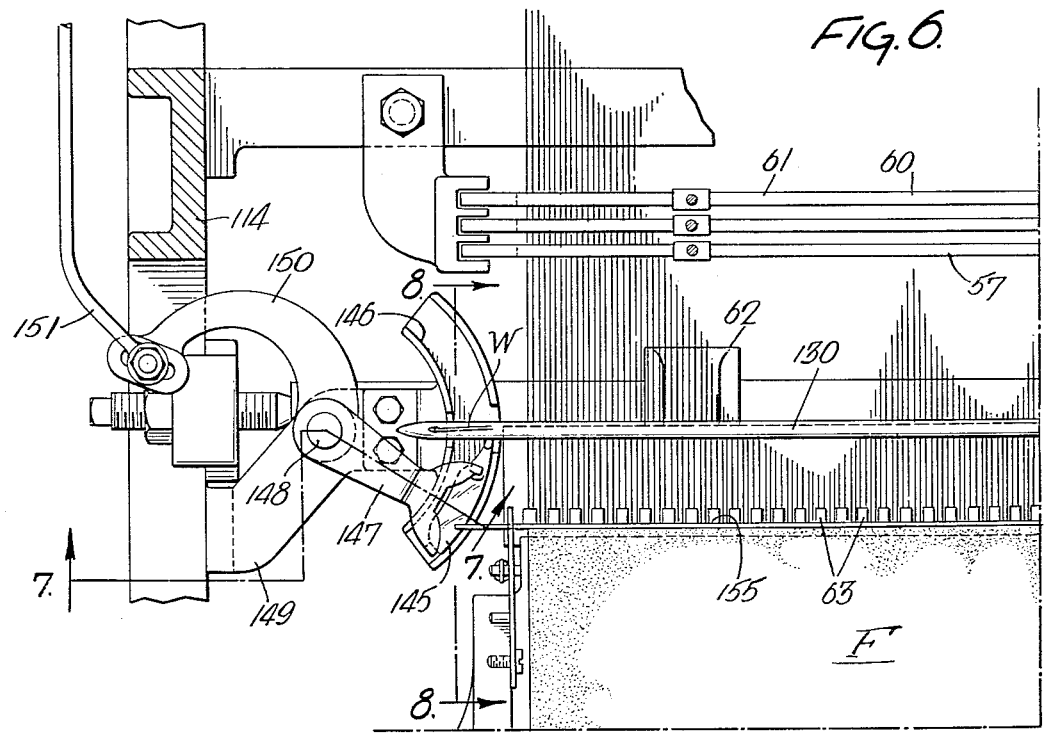
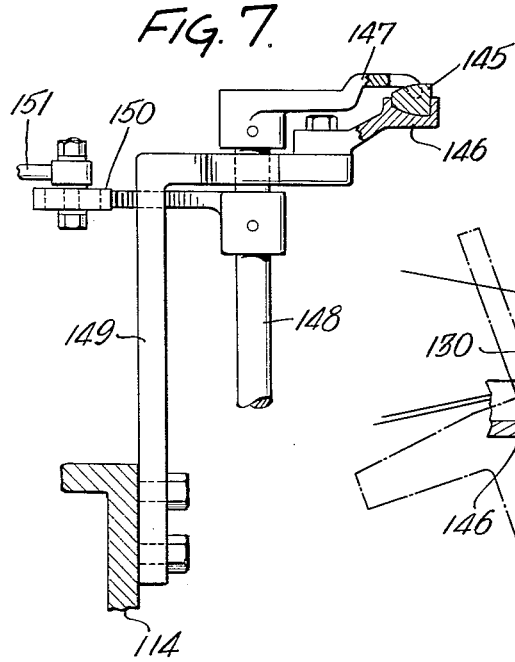
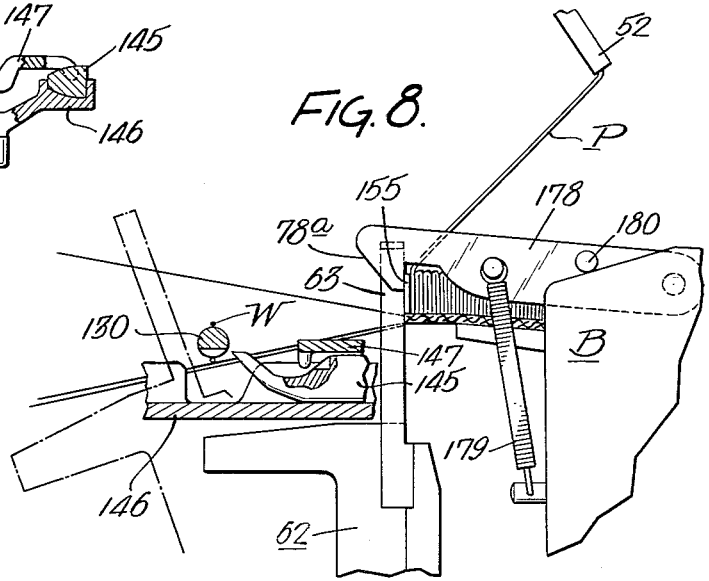
Inventors:
Arthur J. Eisler
Melvin F. Moxley
by their Attorneys
Howson & Howson

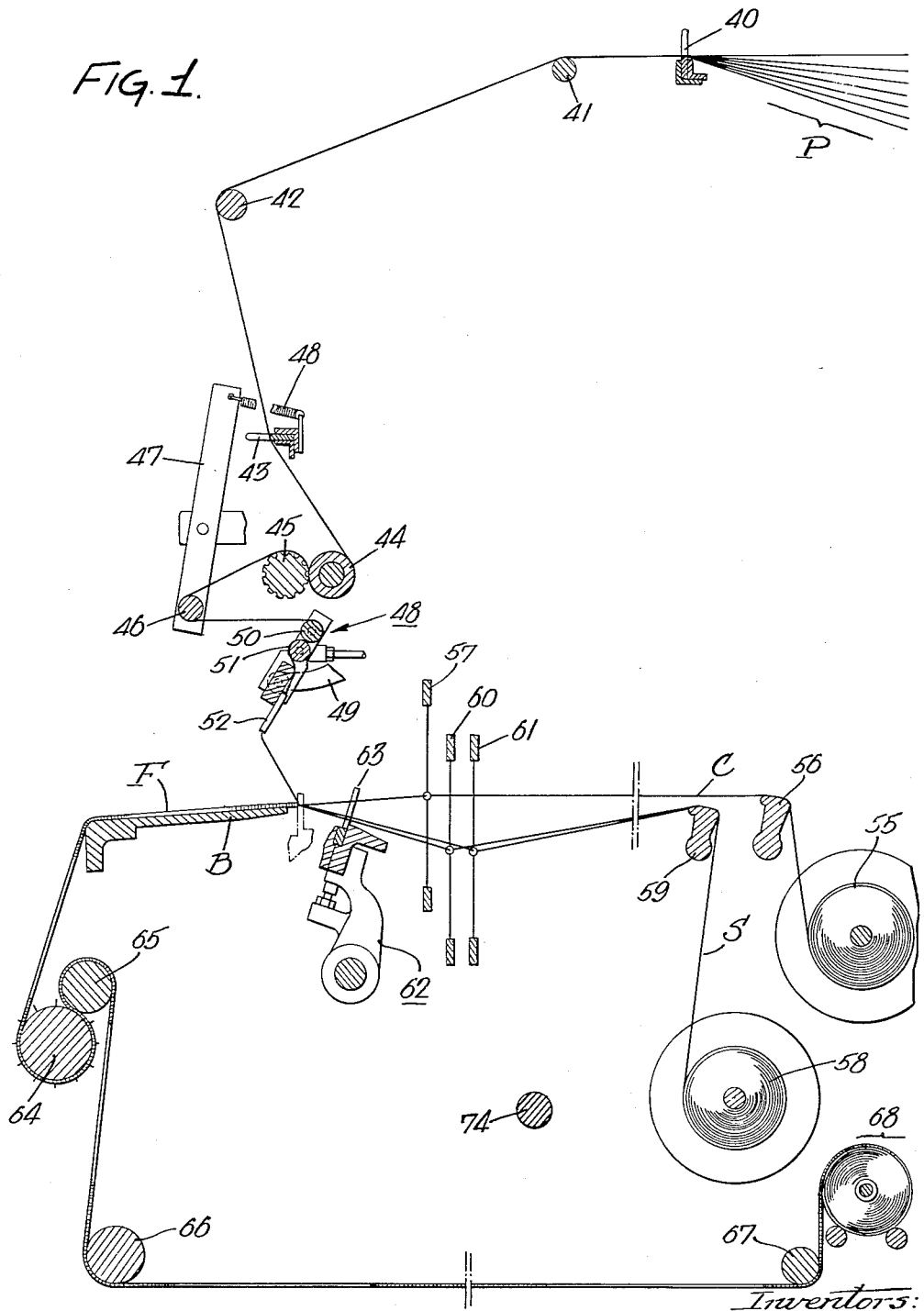

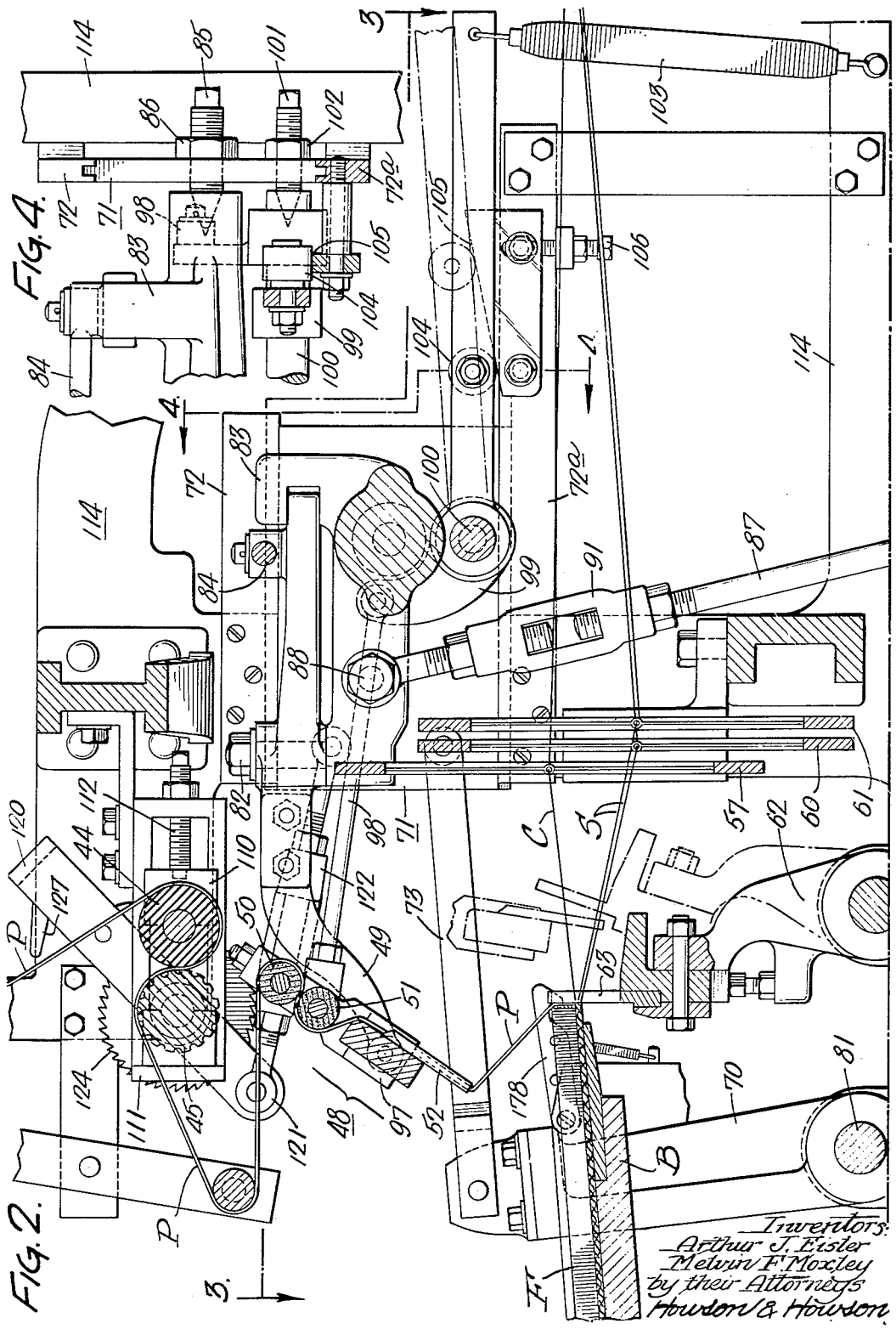

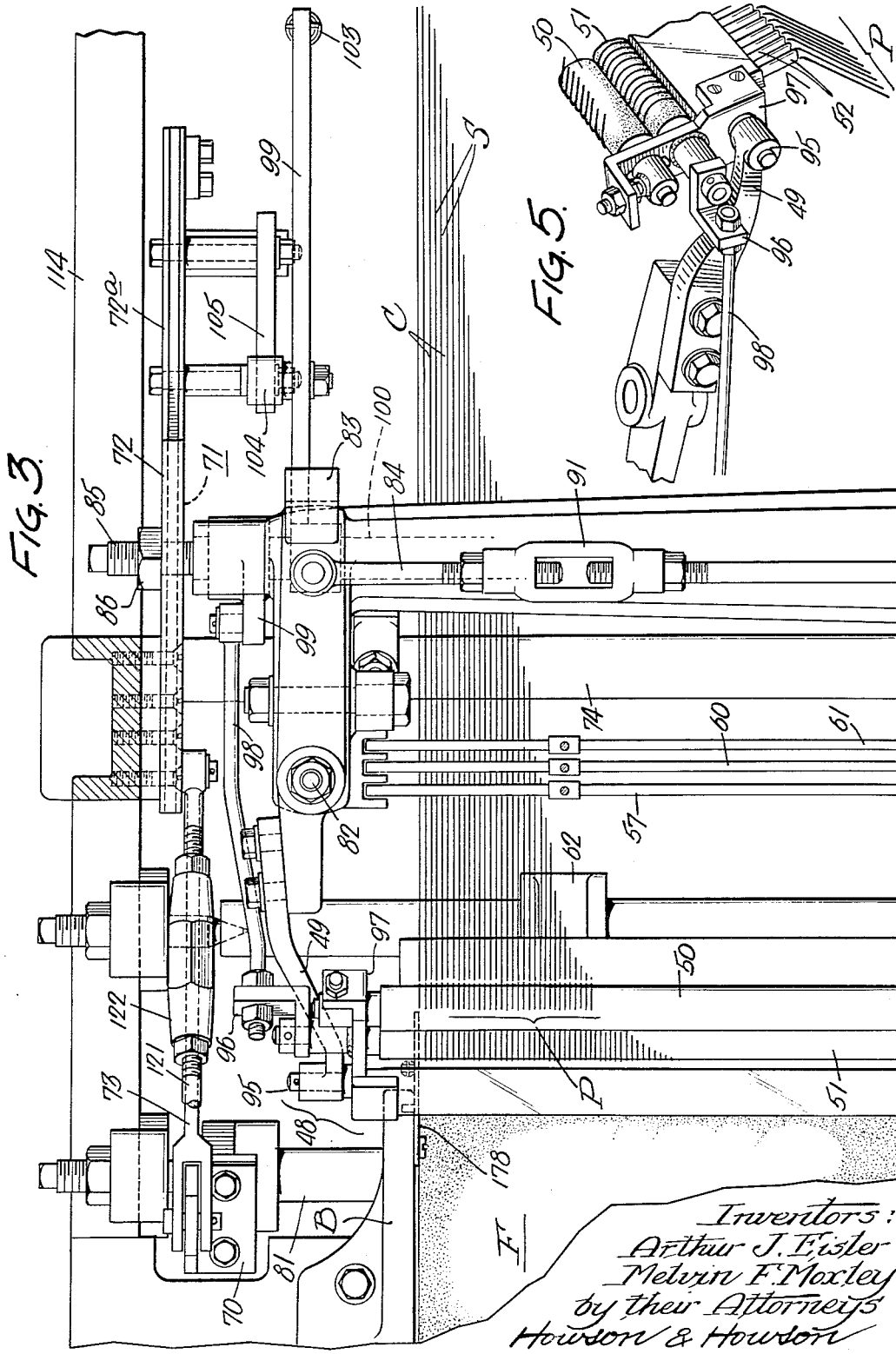

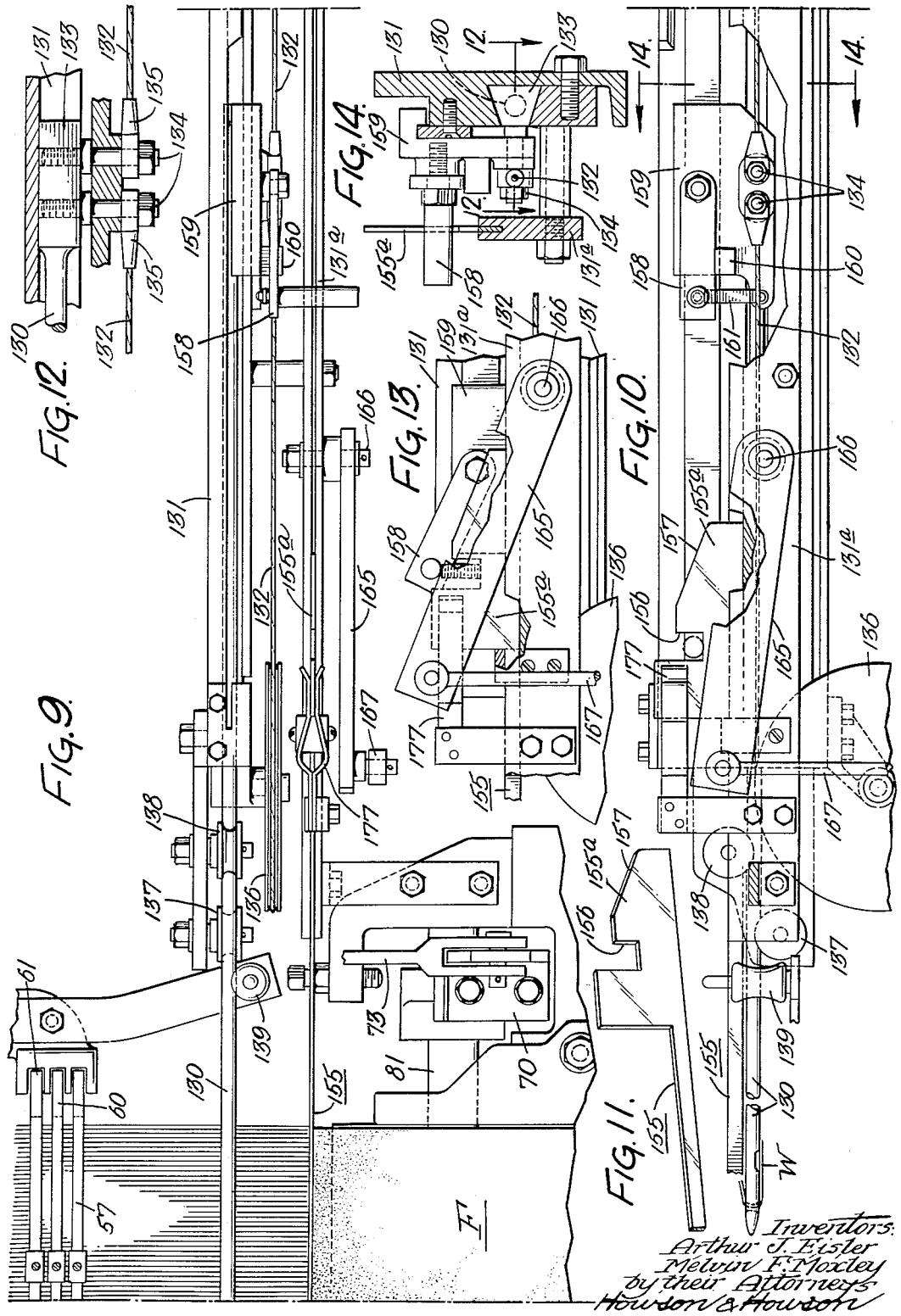

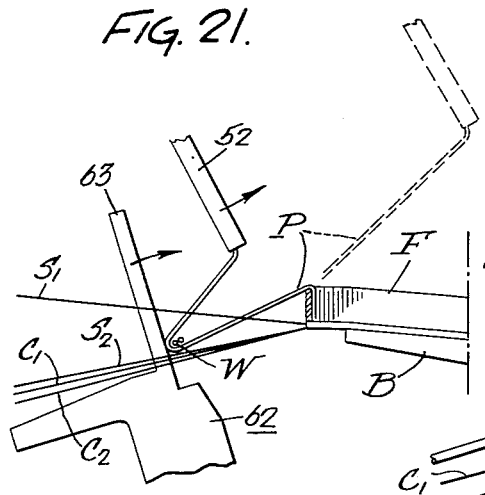
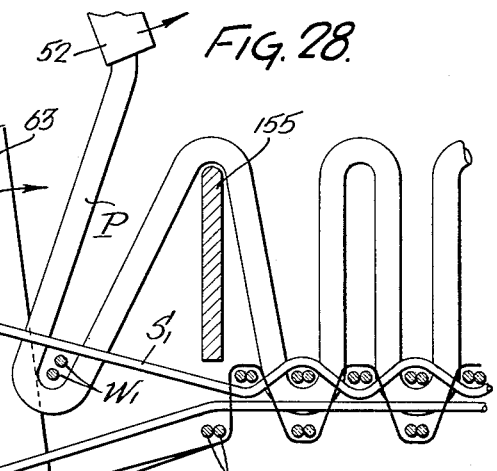
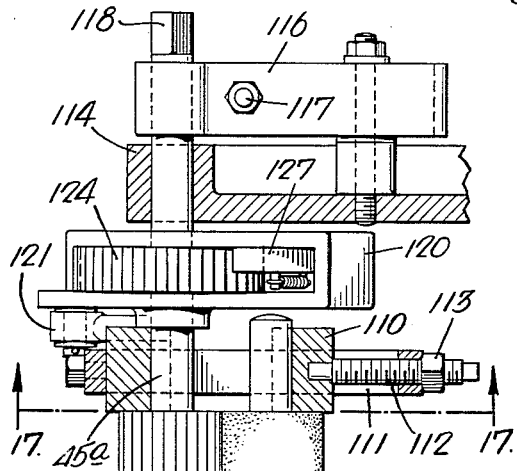
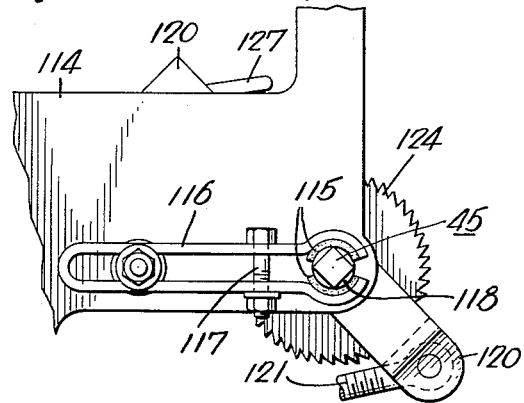
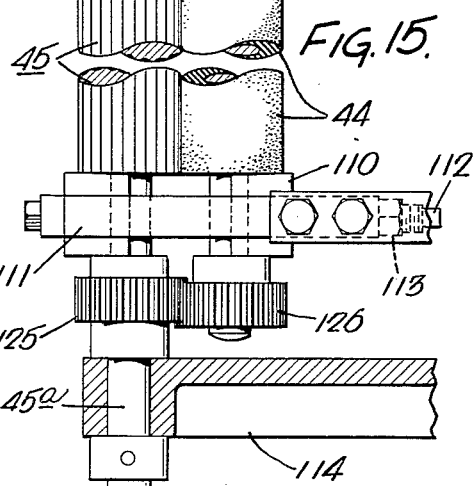
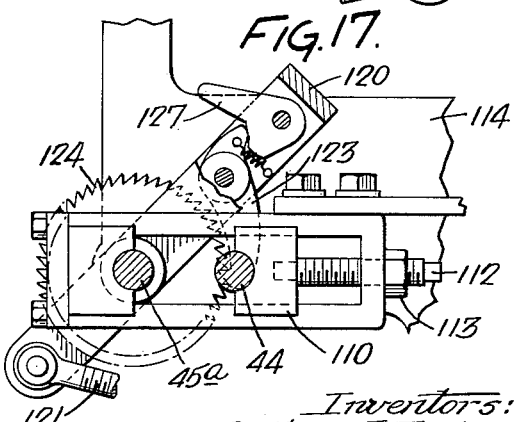

Inventors:
Arthur J. Eisler
Melvin F. Moxley
by their Attorneys
Howson & Howson

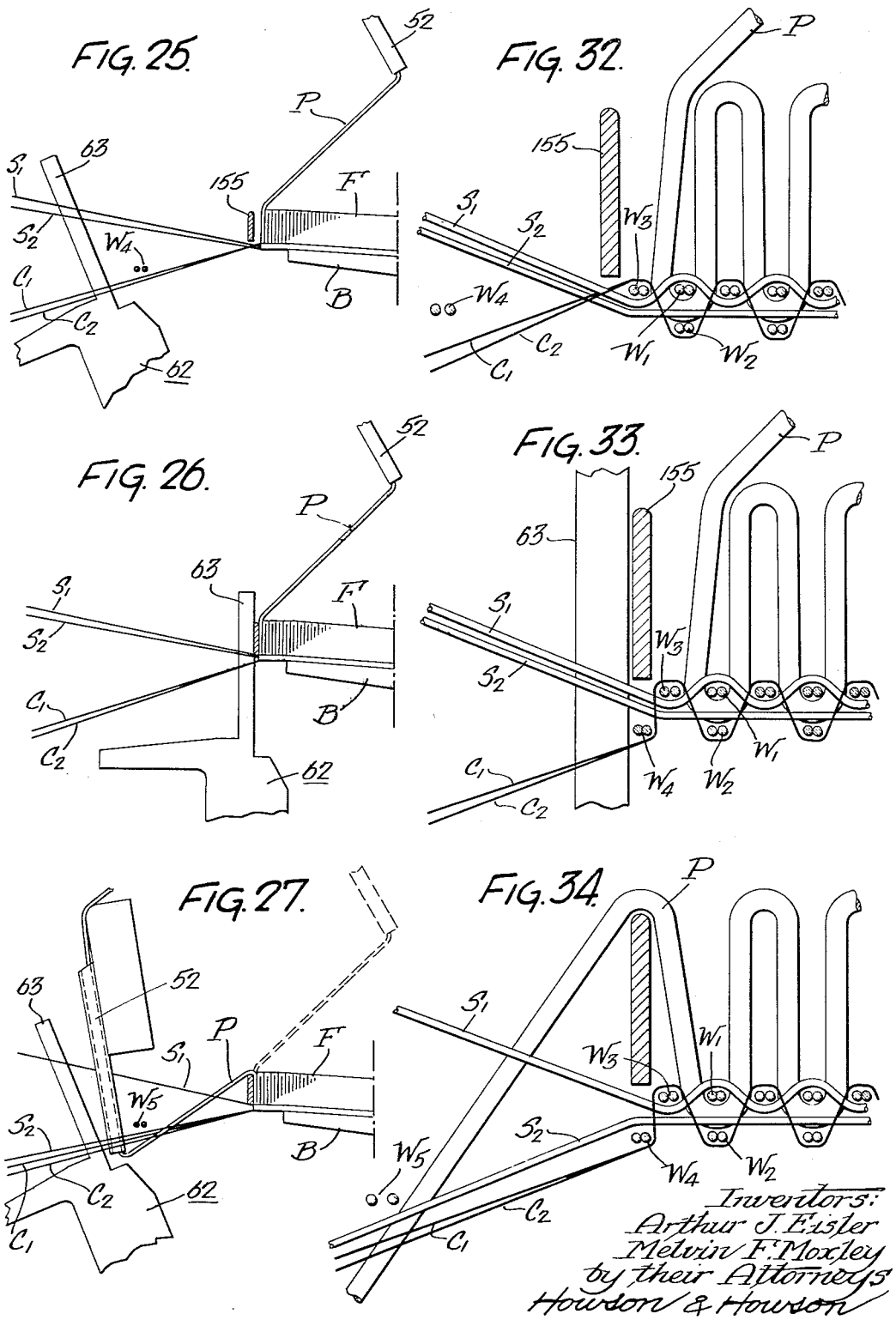

Inventors:
Arthur J. Eisler
Melvin F. Moxley
by their Attorneys
Howson &
Howson

United States Patent Office 2,715,918
Patented Aug. 23, 1955

2,715,918

MODIFIED AXMINSTER LOOM AND METHOD

Arthur J. Eisler, Lexington, and Melvin F. Moxley, Glasgow, Va., assignors to James Lees and Sons Company, Bridgeport, Pa., a corporation of Pennsylvania Application February 26, 1952, Serial No. 272,573

22 Claims. (Cl. 139—39)

This invention relates to Axminster looms, and more particularly to a modified Axminster loom capable of weaving a loop pile fabric.

The conventional Axminster loom utilizes a needle for inserting the weft shots and a tube frame for inserting the individual pile ends. Such a loom is characterized by the fact that the pile ends are "wiped" into the ground fabric, and the pile is thereupon cut by a knife to permit the succeeding frame to be brought into position for placing the next row of pile yarn. The advantage of an Axminster loom and fabric is that an infinite variety of colors and patterns is thus obtainable.

By using a single pile wire and by modifying the standard Axminster loom in several respects we have found that a very satisfactory yet relatively inexpensive fabric can be produced. The pile ends are drawn from a beam and are carried through a single tube frame which intermittently dips into the shed to carry the pile ends over the pile wire. The usual Axminster needle is used in the standard manner but the action of the needle and the wire are inter-connected to provide the desired relative timing of the shots with regard to the insertion of the wire.

A primary object of the invention therefore is to provide a modified Axminster loom capable of weaving a loop pile fabric.

A further object of the invention is to provide a single pile wire for an Axminster loom.

A further object of the invention is to provide suitable mechanism for selectively actuating the pile wire of an Axminster loom with respect to the needle.

A further object of the invention is to modify the knife actuating mechanism of an Axminster loom to operate a single tube frame instead of the knife.

A further object of the invention is to provide suitable draw rolls and feed mechanism for supplying pile yarn to a single tube frame Axminster loom.

A further object of the invention is to provide an improved method for weaving a loop pile Axminster fabric.

A further object of the invention is to provide an Axminster fabric characterized by uncut pile loops.

Further objects will be apparent from the specification and drawings in which:

Fig. 1 is a schematic view showing portions of our improved Axminster loom;

Fig. 2 is a fragmentary longitudinal sectional detail showing modifications of the conventional Axminster loom;

Fig. 3 is a fragmentary sectional detail as seen at 3—3 of Fig. 2;

Fig. 4 is a fragmentary sectional detail as seen at 4—4 of Fig. 2;

Fig. 5 is a perspective of one end of the tube frame assembly;

Fig. 6 is a fragmentary top view showing the needle and shuttle mechanism;

Fig. 7 is a fragmentary detail partly sectioned as seen at 7—7 of Fig. 6;

Fig. 8 is a fragmentary sectional detail as seen at 8—8 of Fig. 6;

Fig. 9 is a top view of the wire and needle actuating mechanism;

Fig. 10 is a front view of part of the structure of Fig. 9;

Fig. 11 is a perspective showing the wire head;

Fig. 12 is a sectional detail as seen at 12—12 of Fig. 14.

Fig. 13 is a fragmentary detail showing the wire latch;

Fig. 14 is a transverse sectional view as seen at 14—14 of Fig. 10;

Fig. 15 is an enlarged sectional detail of the pile yarn draw rolls;

Fig. 16 is a rear view of the structure of Fig. 15;

Fig. 17 is a sectional detail as seen at 17—17 of Fig. 15;

Figs. 21–27 are diagrammatic views showing progressively the relative positions of the lay, tube frame, wire, pile warp, chain warp, and stuffer warps during the weaving operation;

Figure 35:
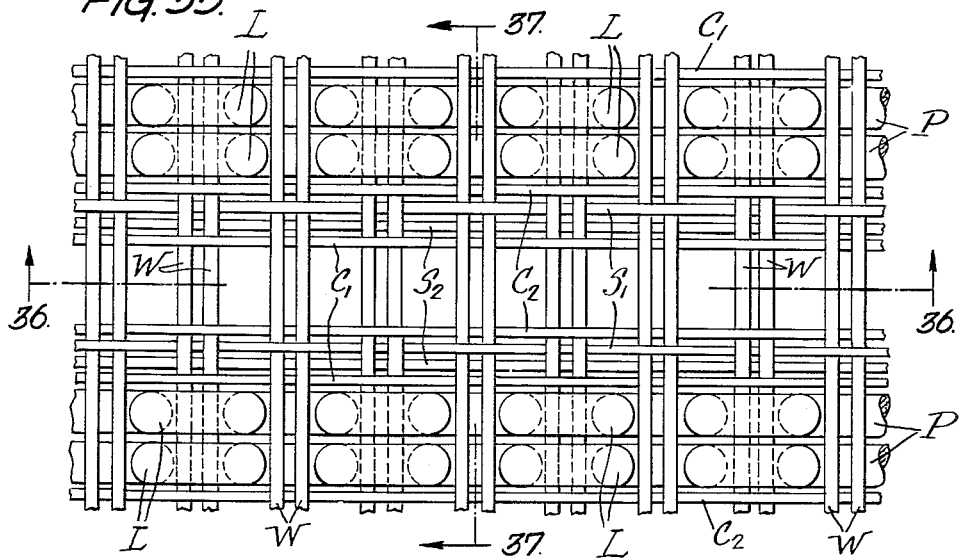
Figure 36:
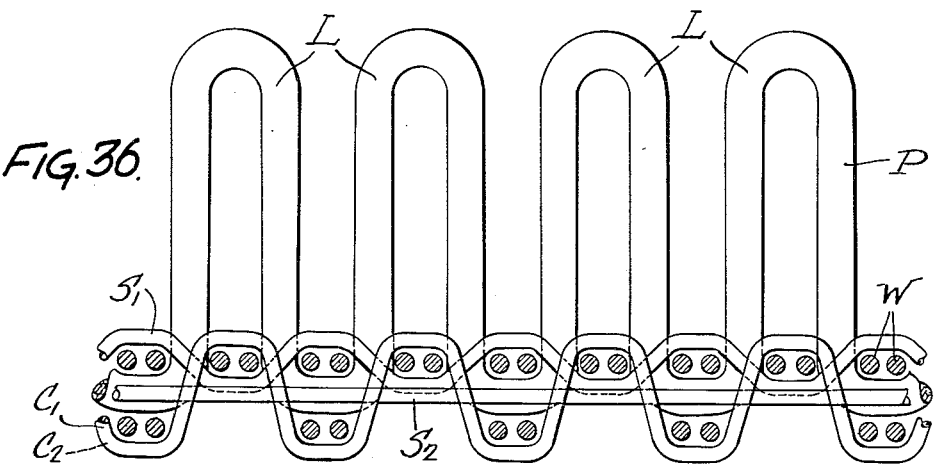

Figs. 28–34 correspond respectively with Figs. 21–27 and show the fell of the carpet on a greatly enlarged scale;

Fig. 35 is a diagrammatic face view of our Axminster fabric;

Fig. 36 is a schematic warp-wise section as seen at 36—36 of Fig. 35; and

Figure 37:
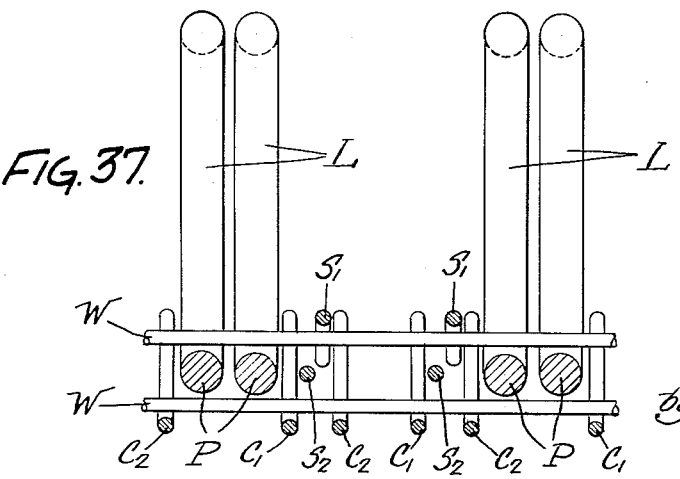

Fig. 37 is a schematic weft-wise section as seen at 37—37 of Fig. 35.

The invention comprises essentially the provision of an oscillating single tube frame in an Axminster loom through which a continuous set of warp pile ends are drawn by suitable draw rolls from a beam or creel. The tube frame is dipped into the shed so that the pile yarns are formed over a pile wire which is intermittently inserted and withdrawn from the shed through a modified needle motion. Since the needle must be inserted and withdrawn more frequently than the wire, we provide a selectively disengageable latch which operates the needle and wire jointly in accordance with a suitable cam control mechanism. The dipping and tilting of the single tube frame is achieved by connecting a pair of longitudinally slidable plates to the conventional knife arm and the auxiliary cam actuated controls supply the proper variation in tilt for the tuft tubes. When the pile wire is inserted into the shed it becomes unhooked from the needle and is retained at the fell in a beat-up position by a wire catch.

Referring now more particularly to the drawings, the general arrangement of our improved Axminster loom can best be seen in Fig. 1 which shows the warp pile ends P running through the first comb guide 40, thence over guide bar 41 and roller 42 to the second comb guide 43; from thence the pile yarn passes around the first driven rubber feed or draw roll 44 and then over a serrated driven feed or draw roll 45. A suitable tensioning bar 46 mounted on pivoting arm 47 and spring loaded at 48 serves to impart the desired tension to the pile yarn between feed roll 45 and the tube frame assembly 48. The tube frame assembly 48 is pivotally mounted on clutch arms 49, 49 and comprises an upper roller 50 and a lower roller 51 around which all the pile ends are threaded as shown in Fig. 1. Each end is carried through individual tuft tubes 52, 52 in a manner similar to the threading of a conventional Axminster tube frame. As will be explained more fully hereafter, the tube frame assembly 48 is oscillated to dip into the shed, thus carrying the pile yarns over a pile wire and under the needle in a predetermined sequence to weave the fabric.

The chain warps C are fed from a suitable beam 55 over warp jumbo 56 and through the chain harness 57 in the conventional manner. Likewise the stuffer warps S are fed from a beam 58 over warp jumbo 59 and through the stuffer harnesses 60 and 61. The lay 62 is of conventional Axminster construction and carries a beater reed 63 at the top which extends through the shed and beats up the weft shots and the pile wire against the fell of the fabric F.

As the fabric is woven, it is carried over a breast-beam B by the take-up roll 64 and from thence it passes over the take-up idler roll 65 and intermediate rolls 66 and 67, whence it is wound on the carpet roll-up 68.

Figure 18:
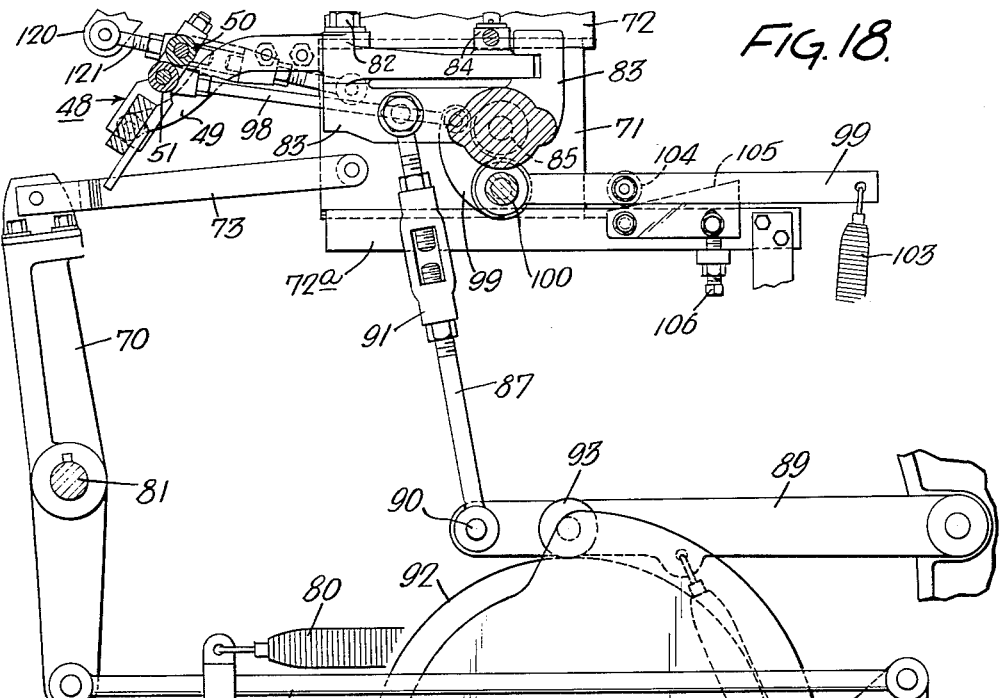
Fig. 18 is a sectional detail showing the driving connections for the tube frame.

The primary modification to the Axminster loom consists in removing the standard knife from the pivoting front knife arms 70, 70 and connecting each of the knife arms to a frame slide 71, 71 on either side of the loom. It will be understood that the construction for each side of the loom is substantially identical, although for purposes of clarity only one side has been illustrated in the drawings. Dual reference numbers are therefore used to indicate parts which appear on either side of the loom, although not necessarily illustrated in duplicate. The frame slides 71, 71 move longitudinally of the loom frame in guides 72, 72a as shown in Fig. 4 and links 73, 73 connect the frame slides with the knife arms so that pivotal movement of the arms is transmitted to the slides. Fig. 18 illustrates the actuating mechanism for the knife arms which is achieved from the main loom camshaft 74 through cam 75, cam follower 76, rocker arm 77, and rod 78. Rocker arm 77 is mounted in the loom frame at 79 and a helical extension spring 80 is connected to the rod 78 to urge the cam follower against the cam face. The opposite knife arm 70 (Fig. 9) is keyed to the knife arm shaft 81 so that the arms oscillate in unison.

The tube frame assembly 48 is pivotally mounted in the conventional loom clutch arms 49, 49 as previously described. These clutch arms normally pivot at 82 on the clutch arm bracket 83, but in the present modification, this pivoting action for the clutch arms is not needed so that we conveniently lock the clutch arms to the bracket 83 by means of a tie rod 84. It will be understood, however, that the arms may be formed integrally with the bracket 83 or they may be locked to the bracket in any other convenient manner. Bracket 83 which carries the clutch arms and tube frame assembly 48 is journaled between the frame slides 71, 71 on adjustable cone pointed screws 85, 85 which may be securely retained in the frame slides by means of lock nuts 86, 86. Vertical pivoting movement of bracket 83 is controlled through a tie rod 87 connected to the frame slide 71 at 88 and to a rocker arm 89 at 90. A turnbuckle 91 in rod 87 enables proper adjustment for the pivoting movement of the tube frame to be made. It will be seen that when the frame slide 71 reciprocates horizontally, the bracket 83 is caused to pivot in accordance with the position of rocker arm 89 which is in turn controlled by a second cam 92 keyed to camshaft 74 and a cam follower 93. Extension spring 94 urges the cam follower 93 into contact with the cam face.

In addition to the horizontal and vertical components of the movement of the tube frame assembly 48, we also provide for tilting of the assembly in the clutch arms. For this purpose, the tube frame assembly 48 is journaled at each end in the clutch arms at 95, 95 (Fig. 5) and control of the pivotal movement is achieved through brackets 96, 96 connected to side members 97, 97 of the tube frame assembly. Each bracket 96 anchors a tie rod 98 which at the other end is pivoted to a modified bell crank 99 keyed to a cross shaft 100 which is in turn journaled on cone pointed screws 101, 101 adjustably retained in the frame slides 71, 71 by means of lock nuts 102, 102. The actuating structure at each side of the tube frame assembly is not illustrated, but in the preferred form it will be identical. Bell crank 99 is spring loaded by a spring 103 and carries a roller 104 which engages a fixed cam surface 105 adjustably mounted on the lower frame slide guide 72a (Fig. 18). A suitable set screw 106 provides the desired adjustment for the position of the cam surface 105. As the frame slide 71 moves to the right in Fig. 18, roller 104 rides upwardly on cam surface 105, thus pivoting bell crank 99 as well as tube frame assembly 48 in a counter-clockwise direction.

Referring now to Figs. 2 and 3, the pile ends are brought down and around the feed roll 44, thence up and over feed roll 45 which is resiliently compressed against roll 44. The pressure between the feed rolls 44 and 45 is controlled by a pair of slidable blocks 110, 110 which are positioned in guide brackets 111, 111 by means of set screws 112, 112 and lock nuts 113, 113. The shaft 45a of the feed roll 45 is journaled in frame members 114, 114 and is provided with a friction brake 115 which is adjusted by means of a clamp 116 and bolt 117. Shaft 45a can be manually turned through the square head 118 on the shaft so that the pile yarn may be fed through the loom when setting up. Automatic feed for rolls 44 and 45 is provided through a pawl and ratchet mechanism shown in detail in Fig. 17. A reciprocating arm 120 is connected to the frame slide 71 through a rod 121 having an adjustable turnbuckle 122. Whenever the frame slide 71 moves horizontally, the pawl 123 on the arm 120 turns feed roll 45 an amount equal to one or more notches in the ratchet 124. The feed rolls are interconnected at the opposite end through a pair of spur gears 125 and 126 as shown in Fig. 15. Arm 120 is also provided with a convenient lock-out device 127 if it is desired to hold the pawl 123 disengaged from ratchet 124.

It will thus be understood that the feed for the pile ends is automatically achieved from the oscillation of the frame slides so that the warp pile is supplied to the felt covered rollers 50 and 51 on tube frame assembly 48 in the desired quantity and under the desired tension. Figs. 2, 3, and 5 show the warp yarns passing around rollers 50 and 51 and thence through the tuft tubes 52, 52.

The wire motion of our improved loom is illustrated in Figs. 9–14 in which the conventional Axminster needle 130 is carried in and out of the shed on needle rail 131. A flexible cable 132 is secured to the needle head 133 by means of studs 134, 134 and connectors 135, 135. The cable 132 passes over cable pulley 136 and is actuated from the loom drive mechanism in the conventional manner. Needle 130, as well as the weft yarn W is guided by a plurality of rollers 137, 138, and 139 in accordance with usual practice. Before describing the pile wire and its actuating mechanism, it will be understood that the weft yarn W is carried through the shed by the needle whereupon it is bound by the standard Axminster shuttle mechanism shown in Figs. 6–8. A shuttle 145 is oscillated back and forth in a shuttle race 146 by means of a shuttle carrier 147 which is in turn mounted on a vertical shaft 148 journaled in bracket 149 (Fig. 7). Oscillation of the shaft 148 is provided through a lever 150 and a rod 151 connected to suitable actuating mechanism not shown.

The pile wire 155 has a specially shaped head (Fig. 11) 155a having a notch 156 and a sloping edge 157. The wire 155 which rides on a wire rail 131a is intermittently inserted into and withdrawn from the shed by the needle. For this purpose, a spring loaded wire latch 158 is mounted on a carriage 159 that slides on the needle rail 131. The wire latch 158 is spring loaded against abutment 160 by means of a helical spring 161. The latch 158 is in alignment with the notch 156 in the wire head 155a so that when the latch is firmly seated in notch 156 the wire 155 moves simultaneously with the needle. When the wire is inserted into the shed, it is carried to its extreme inward position as shown in Fig. 10 by the latch 158. However, the wire must be left in the shed until a succeeding insertion of the needle. To accomplish this result, the latch 158 is lifted from the notch 156 in the wire head by means of the wire latch cam 165 which is pivoted at 166 and controlled by a rod 167. When the wire latch cam is pivoted upwardly as shown in Fig. 13 the wire latch 158 is disengaged from the notch 156 and as the needle is withdrawn from the shed, the latch 158 slides downwardly along the upper edge of the wire latch cam 165, thus leaving the wire in the shed.

Figure 19:
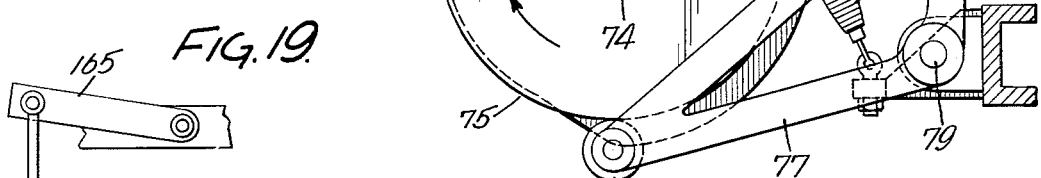
Fig. 19 is a fragmentary view showing the actuating mechanism for the wire latch.
Figure 20:
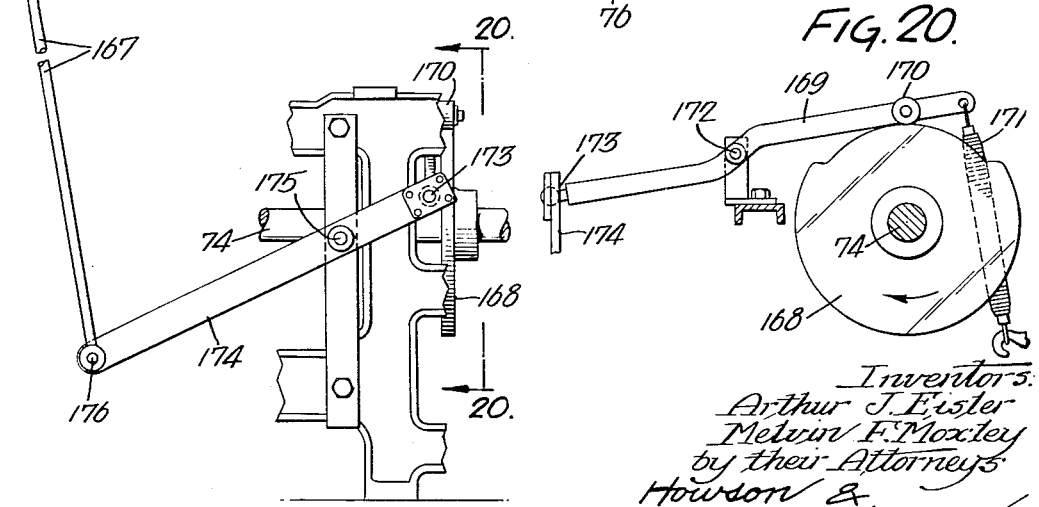
Fig. 20 is a view of the structure of Fig. 19 as seen at 20—20.

Control of the wire latch cam 165 is shown in Figs. 19 and 20. A cam 168 actuates a roller arm 169 through cam follower 170 as shown in Fig. 20. Spring 171 holds cam follower 170 on the cam face and the rocker arm is pivoted to the loom frame at 172. An opposite end of the arm is provided with a ball and socket joint 173 which is secured to one end of an intermediate rocker arm 174 pivoted to the frame at 175 and connected to the lower end of the rod 167 at 176.

When it is desired to withdraw the wire 155 from the shed, the wire latch cam 165 remains in the lower position shown in Fig. 10 so that the wire latch 158 engages sloping edge 157 to permit the latch to ride up the edge and into notch 156. With the wire latch cam lowered, the wire thus becomes connected to the needle carriage 159 so that it is withdrawn together with the needle. A spring clip 177 forms a socket into which the wire head 155a is inserted so that it is properly retained in the shed. When the wire is left in the shed, it will of course, be beaten up against the fell by the beater reed 63, and it is retained in this position by the wire catch 178 (Fig. 8) which is spring loaded by spring 179 against a stop 180 to limit pivoting movement of the catch on the breast-beam B. Since the wire is withdrawn across the shed, it is not necessary to provide means to release the catch. The forward edge 78a on the catch head permits it to pivot upwardly and engage the wire as it is beaten up.

Figure 22:
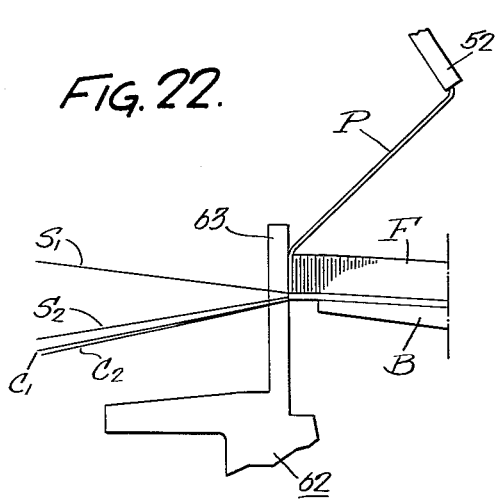
Figure 29:
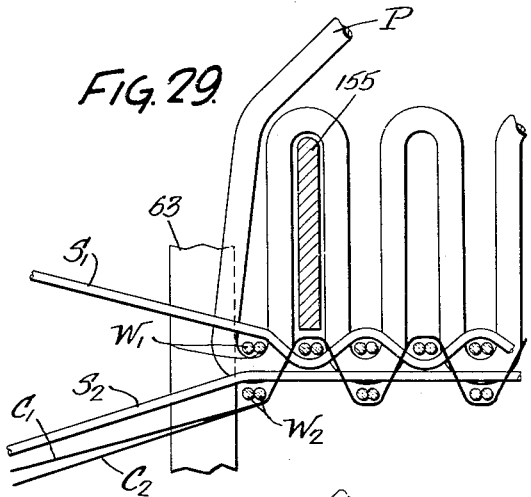
Figure 23:
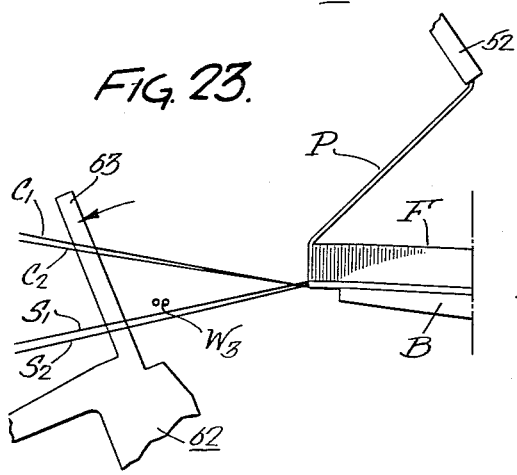
Figure 30:
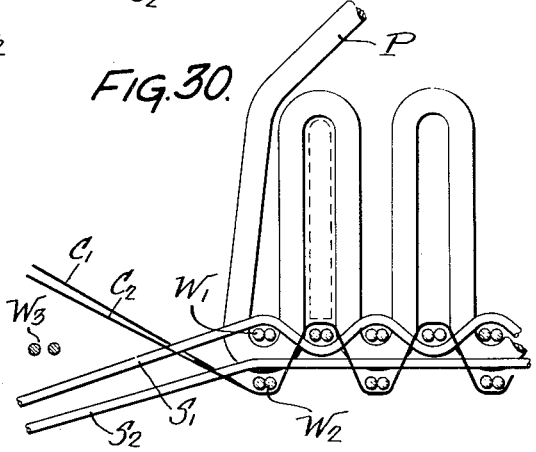

Referring now to Figs. 21-34, the progressive steps in the weaving of a 3 shot Axminster loop pile fabric on our improved loom will be described. In Figs. 21 and 28 the shed is formed by the pile warp P which in this case is partially lowered, the raised stuffer warp S1 and the lowered stuffer warp S2 as well as the lowered chain warps C1 and C2. Ordinarily the shed in textile terminology refers to the space between the warps formed when some of the harnesses are raised and some are lowered. In the present instance, however, the term "shed" is used to include the pile warp yarns carried in the tuft tubes which in the completely raised position are well in front of the fell of the fabric. It will be understood that both chain warps C1 and C2 are controlled by the harness 57 since they always work together. In this position, the needle 130 has just inserted a shot of weft yarn W and the beater reed 63 has partially beat up this shot against the fell of the fabric. In this position, the wire 155 has been left in the shed so that when full beat-up occurs as shown in Figs. 22 and 29 both weft shots W1 and W2 are in position and the tuft tubes 52 have pivoted to a position well in front of the fell. As the lay 62 pivots rearwardly as shown in Figs. 23 and 30, the tuft tubes 52 remain forward, the ground fabric shed changes to raise both the chain warps C1 and C2, whereas both stuffer harnesses are in a lowered position to permit insertion of the next weft shot W3. Upon insertion of the needle for weft shot W3, the wire latch 158 remains in engagement with the wire head, thus withdrawing the wire from the fabric simultaneously with the needle.

Figure 24:
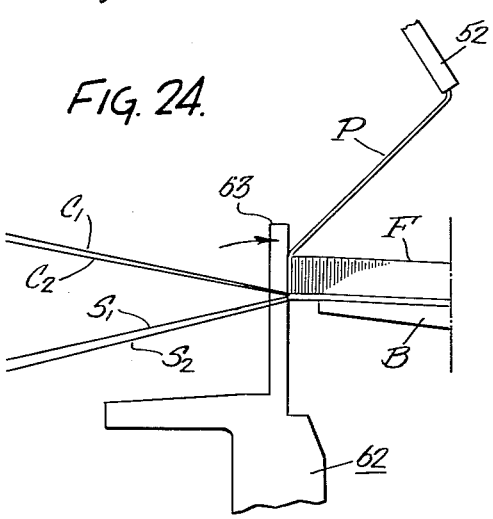
Figure 31:
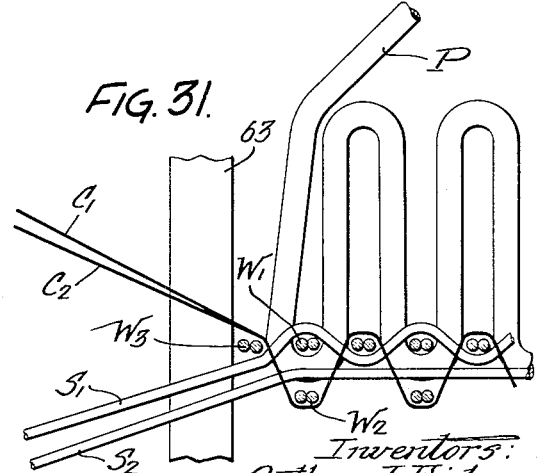

Figs. 24 and 31 show the beat-up for the weft shot W3 which occurs with the wire removed from the fabric and the tuft tubes 52 still in the forward position. The ground fabric shed then changes and the lay 62 oscillates rearwardly whereupon both the wire 155 and the needle are moved into the fabric. This positions the wire above the stuffers at the fell of the fabric, whereas the needle is inserted between the stuffers and chains and is withdrawn leaving the wire in place. In Figs. 25 and 32 the ground fabric shed is formed by raising of both the stuffer warps S1 and S2 and lowering of the chain warps C1 and C2. This last weft shot W4 is beat up by the beater reed 63 which also beats the wire 155 into the fell to engage it in the wire catches 178, 178. Figs. 26 and 33 illustrate the beat-up of the wire and weft shot W4. The next oscillation of the lay occurs with a change in the shed in which the warps are positioned as shown in Figs. 21 and 28 with S1 being raised and S2, C1, and C2 being lowered. At this point, the tube frame assembly dips to pull the pile yarn P down into the ground fabric shed to permit weft shot W5 to be made by the needle. It will be noted that the wire 155 is latched in position during the downward movement of the tuft tubes 52 so that the pile yarn is pulled down and over the wire. As soon as the needle has been withdrawn without retracting the wire, the tuft tubes 52 are again elevated as shown in Figs. 21 and 28, and the sequence is repeated. Insofar as the fabric construction is concerned, weft shot W1 is the same as shot W5 and weft shot W2 is the same as shot W4 since the fabric illustrated is only a 3 shot construction.

It will be understood that the foregoing description refers in considerable detail to a typical Axminster weave that can be produced on our improved Axminster loom. However, it is entirely possible to modify the weave so that any desired variation in the fabric can be achieved. Figs. 35-37 illustrate schematically such a typical fabric and indicate clearly that the pile loops L are bound under alternate weft shots W and that there is a stuffer warp S2 buried in the ground fabric, which is in turn bound by the other stuffer warp S1 as well as the double chain warps C1 and C2. Also in the preferred fabric we have chosen to show pairs of pile loops between adjacent chain warps C1 and C2. However, it is possible to make many variations of this typical fabric in accordance with well-known practice in threading-up an Axminster loom.

We have therefore described an improved apparatus and method which provides an entirely new type of loop pile fabric. It has the desirable characteristics of a velvet fabric woven on the conventional pile wire velvet loom, but in addition, it is much less expensive to produce. The loom structure is relatively simple and eliminates the necessity for the use of a shuttle and a separate wire motion. Variations in effect may, of course, be achieved by using a plurality of pile wires which may be of different height or which may be a cutting, a serrated, or a flag wire depending upon the effect desired.

Having thus described our invention, we claim:

1. In an Axminster carpet loom having a frame, a camshaft, a knife arm shaft, at least one knife arm keyed to said arm shaft and timing connections between the arm and camshaft, the improvement that comprises a pair of frame slides positioned for horizontal movement in the loom frame, at least one tie rod connecting the frame slides to the knife arm shaft, a bracket journaled between said frame slides, a pair of clutch arms on said bracket, a tuft tube frame assembly journaled in said clutch arms, a cam controlled connection attached to said clutch arms for dipping the tuft tube frame assembly into the ground shed of a fabric being woven, and means for tilting the tuft tube frame assembly in the clutch arms as said assembly is dipped.

2. In an Axminster carpet loom having a frame, a camshaft, a knife arm shaft, at least one knife arm keyed to said arm shaft and timing connections between the arm and camshaft, the improvement that comprises a pair of frame slides positioned for horizontal movement in the loom frame, at least one tie rod connecting the frame slides to the knife arm shaft, a bracket journaled between said frame slides, a pair of clutch arms on said bracket, a tuft tube frame assembly journaled in said clutch arms, a cam controlled connection attached to said clutch arms for dipping the tuft tube frame assembly into the ground shed of a fabric being woven, a bell crank pivoted on each frame slide, means including a cam for pivoting said bell cranks when the frame slides move in the loom frame, and connections between the bell cranks and the tube frame assembly for tilting the tube frame assembly when dipped into the shed.

3. In an Axminster carpet loom having a frame, a camshaft, a knife arm shaft, at least one knife arm keyed to said arm shaft, timing connections between the arm and camshaft, a needle and a needle motion, the improvement that comprises at least one pile wire positioned adjacent said needle, a pivoting latch on the needle, walls defining a notch at one end of said wire, a sloping forward edge adjacent said notch, a latch cam for selectively raising the latch to hold the latch in a disengaged position with regard to the notch, timing connections between said latch cam and camshaft whereby the wire is inserted into and withdrawn from the shed of a fabric in accordance with the movement of the needle, means for selectively raising said latch, a clip to hold the wire in proper position in the shed, a pair of frame slides positioned for horizontal movement in the loom frame, at least one tie rod connecting the frame slides to the knife arm shaft, a bracket journaled between said frame slides, a pair of clutch arms on said bracket, a tuft tube frame assembly journaled in said clutch arms, a cam controlled connection attached to said clutch arms for dipping the tuft tube frame assembly into the ground shed of a fabric being woven, and means for tilting the tuft tube frame assembly in the clutch arms as said assembly is dipped.

4. In an Axminster carpet loom the subcombination that comprises a pair of clutch arms, a tuft tube frame pivotally mounted in said arms, a pair of guide rollers journaled in said frame, and means for tilting the tuft tube frame assembly in the clutch arms.

5. In an Axminster carpet loom the subcombination that comprises a pair of clutch arms, a tuft tube frame pivotally mounted in said arms, a pair of guide rollers journaled in said frame, means for tilting the tuft tube frame assembly in the clutch arms, a pair of driven feed rolls positioned contiguous to the tuft tube frame assembly whereby warp yarn is fed through the feed rolls to the rollers on the tube frame assembly.

6. Apparatus in accordance with claim 5 having a tensioning bar over which the warp pile yarn is wound between the feed rolls and the tuft tube frame assembly.

7. Apparatus in accordance with claim 5 in which one of the feed rolls is serrated and the other feed roll has a resilient face.

8. Apparatus in accordance with claim 5 having means for dipping the tuft tube frame assembly into the ground shed of a fabric being woven.

9. In a loom for weaving pile fabrics composed of pile warps, chain warps, and weft yarns, means to form said chain warps into a succession of sheds open transversely of said chain warps and said loom, a needle disposed transversely of the loom and displaceable longitudinally into and from the sheds, means to insert and withdraw said needle to insert the weft yarns in the sheds, a pile wire disposed in substantially parallel relation to said needle for longitudinal movement into and from said sheds, and means operable to connect said needle to said wire for selective insertion and withdrawal of the wire with the needle.

10. In a loom for weaving pile fabrics composed of pile warps, chain warps, and weft yarns, means to form said chain warps into a succession of sheds open transversely of said chain warps and said loom, a needle disposed transversely of the loom and displaceable longitudinally into and from the sheds, means to insert and withdraw said needle to insert the weft yarns in the sheds, a pile wire disposed in substantially parallel relation to said needle for longitudinal movement into and from said sheds, means defining a notch in said wire, and latch means carried by said needle and selectively engageable with said notch operable to connect said needle to said wire for selective insertion and withdrawal of the wire with the needle.

11. In a loom for weaving pile fabrics composed of pile warps, chain warps, and weft yarns, means to form said chain warps into a succession of sheds open transversely of said chain warps and said loom, a needle disposed transversely of the loom and displaceable longitudinally into and from the sheds, means to insert and withdraw said needle to insert the weft yarns in the sheds, a pile wire disposed in substantially parallel relation to said needle for longitudinal movement into and from said sheds, means defining a notch in said wire, latch means carried by said needle and selectively engageable with said notch operable to connect said needle to said wire for selective insertion and withdrawal of the wire with the needle, and a sloping cam edge on said wire terminating in said notch to guide the latch means into engagement therewith.

12. In a loom for weaving pile fabrics composed of pile chain warps, and weft yarns, means to form said chain warps into a succession of sheds open transversely of said chain warps and said loom, a needle disposed transversely of the loom and displaceable longitudinally into and from the sheds, means to insert and withdraw said needle to insert the weft yarns in the sheds, a pile wire disposed in substantially parallel relation to said needle for longitudinal movement into and from said sheds, means defining a notch in said wire, latch means carried by said needle and selectively engageable with said notch operable to connect said needle to said wire for selective insertion and withdrawal of the wire with the needle, a sloping cam edge on said wire terminating in said notch to guide the latch means into engagement therewith, and means for selectively actuating said latch to hold the same out of engagement with said notch.

13. In a loom for weaving pile fabrics composed of pile warps, chain warps, and weft yarns, a cam shaft, means controlled by said cam shaft to form said chain warps into a succession of sheds open transversely of said chain warps and said loom, a needle disposed transversely of the loom and displaceable longitudinally into and from the sheds, means controlled by said cam shaft to insert and withdraw said needle to insert the weft yarns in the sheds, a pile wire disposed in substantially parallel relation to said needle for longitudinal movement into and from said sheds, means defining a notch in said wire, latch means carried by said needle and selectively engageable with said notch operable to connect said needle to said wire for selective insertion and withdrawal of the wire with the needle, a sloping cam edge on said wire terminating in said notch to guide the latch means into engagement therewith, a latch cam for selectively actuating said latch to hold the same out of engagement with said notch, and timing connections between said cam shaft and said latch cam to effect selective engagement of said latch with said notch.

14. In a loom for weaving pile fabrics composed of pile warps, chain warps, and weft yarns, means to form said chain warps into a succession of sheds open transversely of the loom and displaceable longitudinally into and from the sheds, means to insert and withdraw said needle to insert the weft yarns in the sheds, a pile wire disposed in substantially parallel relation to said needle for longitudinal movement into and from said sheds, means defining a notch in said wire, latch means carried by said needle and selectively engageable with said notch operable to connect said needle to said wire for selective insertion and withdrawal of the wire with the needle, a sloping cam edge on said wire terminating in said notch to guide the latch means into engagement therewith, a latch cam for selectively actuating said latch to hold the same out of engagement with said notch, means to actuate said latch cam to effect selective disengagement of said needle and said wire upon insertion of the latter into the shed, and clip means to maintain the wire in proper position in the shed upon withdrawal of said needle.

15. In a loom for weaving pile fabrics composed of pile warps, chain warps, and weft yarns, a cam shaft, means controlled by said cam shaft to form said chain warps into a succession of sheds open transversely of said chain warps and said loom, a needle disposed transversely of the loom and displaceable longitudinally into and from the sheds, means controlled by said cam shaft to insert and withdraw said needle to insert the weft yarns in the sheds, a pile wire disposed in substantially parallel relation to said needle for longitudinal movement into and from said sheds, means defining a notch in said wire, latch means carried by said needle and selectively engageable with said notch operable to connect said needle to said wire for selective insertion and withdrawal of the wire with the needle, a sloping cam edge on said wire terminating in said notch to guide the latch means into engagement therewith, a latch cam for selectively actuating said latch to hold the same out of engagement with said notch, timing connections between said cam shaft and said latch cam to effect selective disengagement of said needle and said wire upon insertion of the latter into the shed, and clip means to maintain the wire in proper position in the shed upon withdrawal of said needle.

16. In loom for weaving pile fabrics composed of pile warps, chain warps, and weft yarns, means for forming the chain warps into a succession of sheds, means to insert weft yarns into the sheds, and means to insert pile warps into the sheds in substantial parallelism with said chain warps comprising a tube assembly guiding said pile yarns, a frame slide pivotally mounting said tube assembly, means for reciprocating said slide in direction longitudinal of the chain warps, and means for imparting vertical pivotal movement to said tube assembly upon reciprocation of said frame slide to selectively dip said assembly into the shed.

17. In loom for weaving pile fabrics composed of pile warps, chain warps, and weft yarns, means for forming the chain warps into a succession of sheds, means to insert weft yarns into the sheds, and means to insert pile warps into the sheds in substantial parallelism with said chain warps comprising a tube assembly guiding said pile yarns, a frame slide pivotally mounting said tube assembly, means for reciprocating said slide in a direction longitudinal of the chain warps, means for imparting vertical pivotal movement to said tube assembly upon reciprocation of said frame slide to selectively dip said assembly into the shed, and timing connections between said weft yarn insertion means and slide reciprocating means to effect said weft yarn insertion when said tube assembly is dipped into the shed.

18. In a loom for weaving pile fabrics composed of pile warps, chain warps, and weft yarns, means for forming the chain warps into a succession of sheds, means to insert weft yarns into the sheds, and means to insert pile warps into the sheds in substantial parallelism with said chain warps comprising a tube assembly guiding said pile yarns, a bracket pivotally mounting said tube assembly, a frame slide pivotally mounting said bracket, means for reciprocating said slide in a direction longitudinal of the chain warps, and means for rocking said tube frame on said bracket and means for imparting vertical pivotal movement to said bracket, each operable upon reciprocation of said frame slide to selectively dip said assembly into the shed.

19. In a loom for weaving pile fabrics composed of pile warps, chain warps, and weft yarns, means for forming the chain warps into a succession of sheds, means to insert weft yarns into the sheds, and means to insert pile warps into the sheds in substantial parallelism with said chain warps comprising a tube assembly guiding said pile yarns, a bracket pivotally mounting said tube assembly, a frame slide pivotally mounting said bracket, means for reciprocating said slide in a direction longitudinal of the chain warps, means for rocking said tube frame on said bracket, and means for imparting vertical pivotal movement to said bracket, each operable upon reciprocation of said frame slide to selectively dip said assembly into the shed, and timing connections between said weft yarn insertion means and slide reciprocating means to effect said weft yarn insertion when said tube assembly is dipped into the shed.

20. The method of weaving an Axminster pile fabric that comprises the steps of forming a pile wire shed between ground fabric warp yarns and warp pile yarns, inserting a pile wire into said pile wire shed, forming a ground fabric shed with ground fabric warp yarns, simultaneously paying out predetermined lengths of the pile warp yarns and drawing down said predetermined lengths of the pile yarns over said pile wire and into the ground fabric shed, inserting a looped double weft shot into the ground fabric shed over the pile warp yarns to tie said pile warp yarns in the ground fabric, and threading the loop of said double weft shot.

21. The method of weaving an Axminster pile fabric that comprises the steps of forming a ground fabric shed with ground fabric warp yarns, forming a second shed adjacent said ground fabric shed with pile warp yarns, inserting a looped double weft shot into the ground fabric shed, inserting a pile wire into said second shed, threading the loop, beating up the wire and weft shot against the fell of the fabric being woven, simultaneously paying out predetermined lengths of the pile warp yarns and drawing down said predetermined lengths of the pile warp yarns over said wire and into the ground fabric shed, forming a third shed with ground fabric warp yarns, inserting a looped double weft shot into said third shed over the pile warp yarns to tie said pile warp yarns in the ground fabric, threading the loop of said double weft shot, and beating up the weft shot against the fell of the fabric being woven.

22. The method of weaving an Axminster pile fabric that comprises the steps of forming a ground fabric shed with ground fabric warp yarns forming a pile wire shed adjacent said ground fabric shed with pile warp yarns, inserting a first weft shot into said ground fabric shed, inserting a pile wire into said pile wire shed, beating up said first weft shot and the wire against the fell of the fabric being woven, forming a second ground fabric shed, simultaneously paying out predetermined lengths of the pile yarns and drawing down said predetermined lengths of the pile warp yarns over said wire and into the second ground fabric shed, inserting a second weft shot into the ground fabric shed over the pile warp yarns to tie said pile warp yarns in the ground fabric, beating up the second weft shot against the fell of the fabric being woven, forming a third ground fabric shed, inserting a third weft shot in said third ground fabric shed, withdrawing the wire, beating up the third weft shot, and repeating the said steps with said individual wire.

References Cited in the file of this patent

UNITED STATES PATENTS

| Number | Name | Date |
|---|---|---|
| 840,257 | Sarafian | Jan. 1, 1907 |
| 1,676,039 | Mason | July 3, 1928 |
| 2,285,332 | Gebert | June 2, 1942 |
| 2,477,248 | Harding | July 26, 1949 |
| 2,553,303 | Crawford | May 15, 1951 |
| 2,571,077 | Underwood et al. | Oct. 9, 1951 |
| 2,576,791 | Jackson | Nov. 27, 1951 |